(12) United States Patent
Marupaduga (10) Patent No.: US 11,252,637 B1
(45) Date of Patent: Feb. 15, 2022

(54) LIMITING DUAL CONNECTIVITY BASED ON PAIRING EFFICIENCY

(71) Applicant: Sprint Spectrum LP, Overland Park, KS (US)

(72) Inventor: Sreekar Marupaduga, Overland Park, KS (US)

(73) Assignee: T-Mobile Innovations LLC, Overland Park, KS (US)

(*) Notice: Subject to any disclaimer, the term of this patent is extended or adjusted under 35 U.S.C. 154(b) by 38 days.

(21) Appl. No.: 16/826,915

(22) Filed: Mar. 23, 2020

(51) Int. Cl.
*H04W 48/02* (2009.01)
*H04W 48/08* (2009.01)
*H04B 7/0413* (2017.01)
*H04W 76/15* (2018.01)
*H04W 92/10* (2009.01)
*H04W 24/08* (2009.01)
*H04W 60/00* (2009.01)

(52) U.S. Cl.
CPC .......... *H04W 48/02* (2013.01); *H04B 7/0413* (2013.01); *H04W 24/08* (2013.01); *H04W 48/08* (2013.01); *H04W 60/00* (2013.01); *H04W 76/15* (2018.02); *H04W 92/10* (2013.01)

(58) Field of Classification Search
None
See application file for complete search history.

(56) References Cited

U.S. PATENT DOCUMENTS

| | | | |
|---|---|---|---|
| 9,300,587 B1 * | 3/2016 | Hassan | H04L 47/125 |
| 9,948,376 B1 * | 4/2018 | Pawar | H04B 7/0413 |
| 10,070,454 B2 | 9/2018 | Elsherif et al. | |
| 10,218,416 B2 | 2/2019 | Silverman et al. | |

* cited by examiner

*Primary Examiner* — Hong S Cho (57) ABSTRACT

Limiting dual connectivity in a wireless sector served by at least two wireless air interfaces includes monitoring a pairing efficiency metric of wireless devices in the wireless sector. When the pairing efficiency metric rises above a threshold, a maximum number of wireless devices able to attach to one of the at least two wireless air interfaces is increased, and when the pairing efficiency metric falls below the threshold, the maximum number of wireless devices able to attach to one of the at least two wireless air interfaces is decreased. The wireless air interface for which dual connectivity is limited can be a 5G interface, and load is alleviated by limiting dual connectivity thereto.

15 Claims, 6 Drawing Sheets

LIMITING DUAL CONNECTIVITY BASED ON PAIRING EFFICIENCY

TECHNICAL BACKGROUND

As wireless networks evolve and grow, there are ongoing challenges in providing high-quality service to increasing numbers of wireless devices in various coverage areas of a wireless network. Different wireless devices are configured to use different types of applications (such as voice over IP, streaming, gaming, etc.), and each different application may optimally function with a different channel size or bandwidth. Further, radio access technologies (RATs) such as 5G New Radio (NR) are being implemented alongside existing RATs such as 3G and 4G Long Term Evolution (LTE), and wireless devices are increasingly becoming more capable of connecting to these RATs. While channel bandwidths in 4G are static, 5G is capable of deploying various different bandwidths, most of which are higher than 4G bandwidths. Further, "Dual Connectivity" refers to the ability for wireless devices to attach to two or more access nodes and transmit/receive information via two wireless connections simultaneously. In exemplary situations, dual connectivity can include E-UTRAN-NR Dual Connectivity (EN-DC), which uses both 4G and 5G RATs. For example, a wireless device capable of dual connectivity can attach to both 4G and 5G RATs, using the 4G RAT for control transmissions, while using the 5G RAT for data transmissions. Using the 5G RAT for data transmissions is advantageous, as 5G provides higher bandwidths and frequencies versus 4G.

Further, wireless networks may be configured to utilize multiple-input-multiple-output (MIMO), in which multiple data streams can be directed towards one or more eligible wireless devices via various combinations of antennae and transceivers based on the orthogonality of transmission, thereby maximizing resources. MIMO can include single-user MIMO (SU-MIMO), multi-user MIMO (MU-MIMO), and massive MIMO (mMIMO), which extends MU-MIMO to antenna arrays coupled to base stations, the antenna arrays comprising large numbers of controllable antenna elements that enable directing several MU-MIMO streams to various groups or "pairings" of wireless devices. MIMO has been identified as one of the promising air interface technologies to address the capacity requirement required demanded by 5G networks. MIMO works better with higher frequencies, since denser amounts of data can be transmitted in multiple layers using the same frequency resources. Thus, wireless devices that satisfy certain requirements (i.e. pairing criteria) can be configured to receive MU-MIMO streams using the same air-interface resources.

However, there are considerations regarding how to optimally communicate between an access node comprising a plurality of antenna elements utilizing different bandwidths or RATs, and wireless devices with different capabilities and requirements. For example, as increasing amounts of data are being transmitted to 5G capable wireless devices (e.g. multimedia content, live streams, etc.), resources may become scarce. While MIMO increases efficiency of existing air-interface resources such as physical resource blocks (due to, for example, orthogonality of transmission), 5G-capable wireless devices that do not use or otherwise qualify for MIMO transmissions may use excessive amounts of resources.

OVERVIEW

Exemplary embodiments described herein include methods, systems, and processing nodes for limiting dual connectivity based on a pairing efficiency of wireless devices in a sector. An exemplary method for limiting dual connectivity in a wireless sector served by at least two wireless air interfaces includes monitoring a pairing efficiency metric of wireless devices in the sector, and adjusting a maximum number of wireless devices able to attach to one of the at least two wireless air interfaces based on the pairing efficiency metric.

An exemplary system for limiting dual connectivity in a wireless sector includes an access node configured to deploy at least two wireless air interfaces, and a processing node coupled to the access node, the processing node being configured to perform operations including determining that a pairing efficiency metric of wireless devices attached to the access node meets a first threshold, and adjusting a maximum number of wireless devices able to attach to one of the at least two wireless air interfaces responsive to the pairing efficiency metric meeting the threshold.

An exemplary processing node for limiting dual connectivity in a wireless sector served by at least two wireless air interfaces is configured to perform operations including monitoring a pairing efficiency metric of wireless devices in the wireless sector, when the pairing efficiency metric rises above a threshold, increasing a maximum number of wireless devices able to attach to one of the at least two wireless air interfaces, and when the pairing efficiency metric falls below the threshold, decreasing the maximum number of wireless devices able to attach to one of the at least two wireless air interfaces.

DETAILED DESCRIPTION

The following disclosure presents methods and systems for adjusting a number of wireless devices that are permitted to attach to a radio air interface of an access node based on a MIMO pairing efficiency metric associated with the access node. The pairing efficiency may be based on a ratio of a number of wireless devices qualifying for MU-MIMO versus a total number of wireless devices attached to the access node. In particular, for access nodes configured with 5G EN-DC (dual connectivity), the pairing efficiency is determined for wireless devices that qualify for receiving MU-MIMO transmissions via the 5G RAT. In these scenarios, control transmissions may be sent/received via the 4G RAT. Thus, if the pairing efficiency is high (based on, for instance, the number of wireless devices qualifying for MU-MIMO pairing, or other metrics as identified below), then a maximum number of wireless devices able to use dual connectivity (i.e. attach to the 5G RAT) is increased. Conversely, if the pairing efficiency is low, then the maximum number of wireless devices able to attach to the 5G RAT is reduced. Consequently, resources consumption of the 5G interface is limited based on whether or not wireless devices attached to the access node are able to exploit MU-MIMO. Thus, in an exemplary embodiment, a load on the access node may be considered prior to performing the disclosed operations. For example, if the access node (or particularly the 5G RAT deployed therefrom) has a load exceeding a threshold, then the pairing efficiency is monitored and the dual-connectivity is limited based thereon. Further, one or more thresholds are used to compare pairing efficiency metrics against, and the operations may be performed at configurable time periods, enabling load to equalize or settle in between adjustments.

Thus, the operations described herein may be performed by processing nodes and/or access nodes configured to communicate over a plurality of channel sizes and/or RATs. For example, the access node can include a combination of a 4G eNodeB and a 5G gNodeB. In other words, the access node can comprise transceivers that are configured to communicate using 4G LTE as well as transceivers that are configured to communicate using 5G NR. Further, the access node can include a plurality of antennae (or antenna elements), a portion of which is configured to deploy a first bandwidth or RAT (e.g. 4G LTE), and a portion of which is configured to deploy a second bandwidth or RAT (e.g. 5G NR). In addition, in 5G EN-DC systems, control transmissions continue to utilize the non-dedicated 4G antenna elements, reserving the 5G antenna elements for data communication (i.e. payloads, etc.) with the wireless devices meeting the criteria. Generally, 5G NR utilizes larger channel bandwidths and frequencies than 4G LTE. Thus, transmitting data information such as MU-MIMO streams using the second RAT (e.g. 5G) can be beneficial to network operation by, for instance, improving throughput, while transmitting control and/or signaling information using the first RAT (e.g. 4G) can be beneficial by, for instance, utilizing ubiquitous existing infrastructure for performing signaling operations, since dedicating a high-bandwidth portion of antenna ports provides more spectral efficiency.

Thus, as described herein, the access node (and/or processing node communicatively coupled thereto) can be configured to perform operations including monitoring a pairing efficiency metric of wireless devices in the wireless sector, when the pairing efficiency metric rises above a threshold, increasing a maximum number of wireless devices able to attach to one of the at least two wireless air interfaces, and when the pairing efficiency metric falls below the threshold, decreasing the maximum number of wireless devices able to attach to one of the at least two wireless air interfaces. These and other embodiments are further described herein and with reference to FIGS. 1-7 below.

Figure 1:
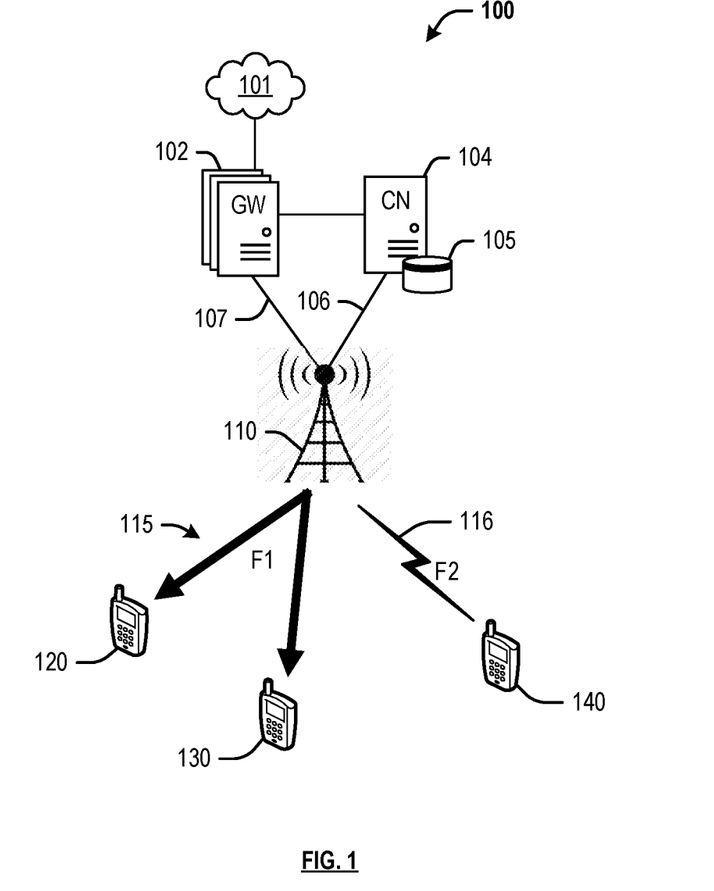
FIG. 1 depicts an exemplary system for limiting dual connectivity based on a pairing efficiency of wireless devices in a sector.

FIG. 1 depicts an exemplary system 100 comprising a communication network 101, gateway 102, controller node 104, access node 110, and wireless devices 120, 130 and 140. In this exemplary embodiment, access node 110 may be configured to deploy carriers using at least two RATs (i.e. wireless air interfaces), e.g. a 4G LTE wireless air interface, and a 5G NR wireless air interface. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. For example, the 5G NR wireless air interface may utilize a first one or more frequency bands referred to here as F1, and the 4G LTE wireless air interface may utilize a second one or more frequency bands referred to here as F2. Further, access node 110 can be configured to communicate using both RATs at the same time. For example, access node 110 can comprise antennae that are configured to communicate with wireless devices 120, 130 via the 5G wireless air interface using frequencies F1 and with wireless device 140 via the 4G wireless air interface using frequencies F2. In an exemplary embodiment, access node 110 is configured to utilize 5G EN-DC, dual connections are initiated with wireless devices 120, 130 using both 4G and 5G carriers, the 4G carrier being used to transmit control information, and the 5G carrier being used to transmit data information. For example, as shown herein, wireless devices 120, 130 are illustrated as receiving a MU-MIMO data stream 115 using frequencies F1, and wireless device 140 is illustrated as using a standard 4G communication link 116 using frequencies F2. In other embodiments, access node 110 may comprise an eNodeB that is coupled to another access node comprising a gNodeB (not shown), such that the dual connectivity utilizes both access nodes. Further, in other embodiments, access node 110 can be among a plurality of access nodes, with various carriers deployed therefrom, as may be evident to those having ordinary skill in the art in light of this disclosure.

Further, a processing node within system 100 (for example, communicatively coupled to access node 110, controller node 104, or any other network node) can be configured to determine whether or not wireless devices 120, 130 are capable of communicating using both RATs, and instruct the access node 110 to broadcast an indicator in, for example, a system information message. For example, access node 110 may use the 4G carrier to control and set up a dual connectivity session with one or both of wireless devices 120, 130. In other words, control information (including SIB messages) is transmitted from the access node 110 using the 4G carrier, while the 5G carrier is utilized for transmission of data. Further, the processing node may be configured to perform operations including monitoring a pairing efficiency metric associated with wireless devices 120, 130, 140 (and any other wireless devices attached to access node 110 and not shown herein), and adjusting a maximum number of wireless devices able to attach to the 5G wireless air interfaces based on the pairing efficiency metric. For example, upon determining that the pairing efficiency metric rises above a threshold, the maximum number may be increased, and upon determining that the pairing efficiency metric falls below a threshold, the maximum number may be reduced or decreased.

Further, the pairing efficiency metric may be based on any combination of an orthogonality associated with each of wireless devices 120, 130, 140, an angular separation required for MIMO pairing for each of wireless devices 120, 130, 140, a threshold data buffer requirement of a buffer on access node 110, or a number of wireless devices from among each of wireless devices 120, 130, 140 that is eligible to join a MU-MIMO group. For example, being eligible for MU-MIMO (or "qualifying" for MU-MIMO) may be based on, for instance, an orthogonality of transmission (in other words, angular separation), so as to maximize resources of a loaded access node, as well as a total number of wireless devices allowed per MIMO group, or a size of a buffer on access node 110. One or more criteria for wireless devices to qualify for MIMO (or adding wireless devices into an existing MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, 130, 140, i.e., DM-RS, or specific to geographical areas of access node 110, i.e., Common Reference Signals ("CRS"). DM-RS' are pre-coded signals used for demodulation purposes on scheduled PRBs. For example, a pre-coding module of access node 110 may apply pre-coding to data transmissions targeted to wireless devices 120, 130, 140 based on channel feedback received from said wireless devices including RI, CQI, and PMI. CRS' are not pre-coded signals and are used by wireless devices 120, 130, 140 for channel estimation. To fully exploit MU-MIMO mode, data/spatial streams intended to/from access node 110 and/or wireless devices 120, 130, 140 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference.

As shown in FIG. 1, wireless devices 120, 130 appear to be eligible for and participating in a MIMO stream 115 using frequencies F1. The pairing efficiency metric can be based on performance of MIMO stream 115, or any other criteria associated with each of wireless devices 120, 130, 140. For example, the pairing efficiency metric can be based on one or more of a size of each MIMO group comprising the eligible wireless devices 120-130, a quantity of eligible wireless devices participating in the MIMO groups, a percentage of total wireless devices attached to the access node 110 (including but not limited to wireless devices 120-140), a throughput of each of the one or more MIMO groups in the sector, an average throughput of each MIMO group or each wireless device in each MIMO group, or an aggregate throughput (i.e. total throughput) of all MIMO signals within the sector (including but not limited to MIMO signal 125). Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources. In an exemplary embodiment, the pairing efficiency metric is based on a ratio of a number of wireless devices qualifying for MU-MIMO versus a total number of wireless devices attached to the access node.

Thus, when the pairing efficiency metric rises to meet (or exceed) a threshold, it can be inferred that more wireless devices are able to utilize MIMO on the 5G wireless air interface, and the maximum number of wireless devices able to attach to the 5G wireless air interface is increased. The increase in wireless devices would not negatively impact the amount of resources in the 5G wireless air interface, because more wireless devices are able to use the same physical resource blocks (due to orthogonality). Whereas, when the pairing efficiency metric falls below the threshold, it can be inferred that fewer wireless devices are able to utilize MIMO on the 5G wireless air interface, and the maximum number of wireless devices able to attach to the 5G wireless air interface is reduced. The reduction in wireless devices ensures that the resources (e.g. physical resource blocks) on the 5G wireless air interface remain available for MIMO or other transmissions for the wireless devices that are eligible. In an exemplary embodiment, different thresholds are used to compare the pairing efficiency metric. For example, a first threshold may be compared when the pairing efficiency metric is rising, and a second threshold may be compared when the pairing efficiency metric is falling. The thresholds may be selected based on a hysteresis, or any other consideration depending on the type of pairing efficiency metric. In an exemplary embodiment, the pairing efficiency metric comprises a ratio or percentage of wireless devices qualifying for MU-MIMO, and the threshold may comprise 50% or a 1:1 ratio, or slightly above and below these values.

Access node 110 can be any network node configured to provide communication between wireless devices 120, 130, 140 and communication network 101, including standard access nodes such as a macro-cell access node, base transceiver station, a radio base station, an eNodeB device, an enhanced eNodeB device, an a next generation or gigabit NodeB device (gNodeB) in 5G networks, or the like. In an exemplary embodiment, a macro-cell access node can have a coverage area in the range of approximately five kilometers to thirty-five kilometers and an output power in the tens of watts. Alternatively, access node 110 may comprise any short range, low power, small-cell access nodes such as a microcell access node, a picocell access node, a femtocell access node, or a home eNodeB/gNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with each other, and other access nodes (not shown), using a wireless link or a wired link such as an X2 link. Components of exemplary access node 110 and processing nodes coupled thereto are further described with reference to FIGS. 2-3.

Wireless devices 120-140 may be any device, system, combination of devices, or other such communication platform capable of communicating wirelessly with access node 110 using one or more frequency bands deployed therefrom. Each of wireless devices 120-140 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120-140. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as load information of access node 110 and carriers deployed therefrom, pairing efficiency metrics of wireless devices 120-140, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication systems 100 may be, comprise, or include computers systems and/or processing nodes. This includes, but is not limited to: access node 110, controller node 104, and/or networks 101, 201.

Figure 2:
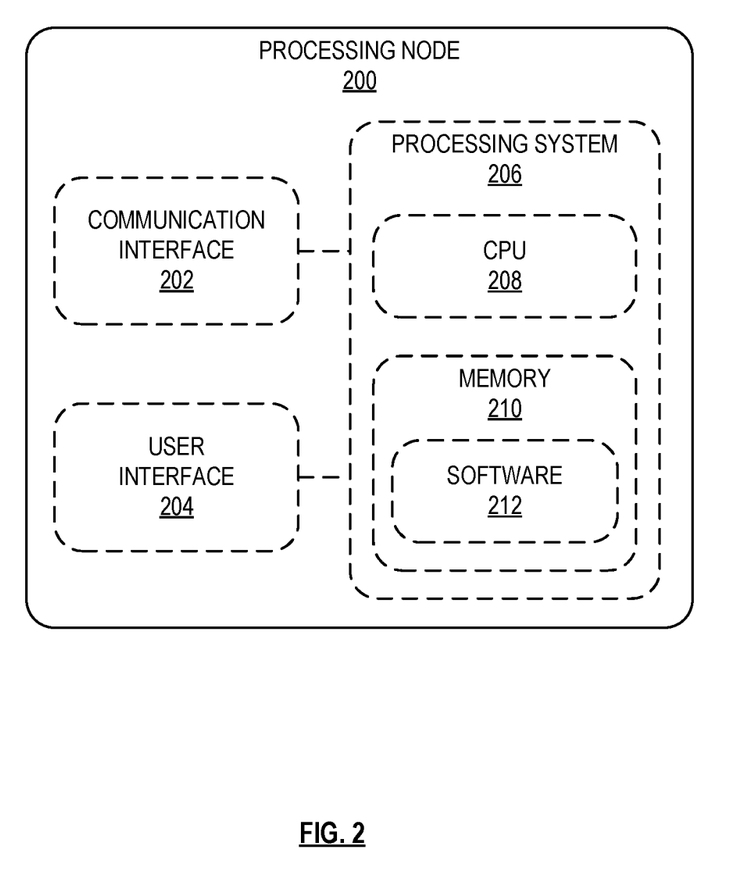
FIG. 2 depicts an exemplary processing node for limiting dual connectivity based on a pairing efficiency of wireless devices in a sector.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Further, memory 210 can store a software 212, which may be executed to perform the operations described herein. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 can include instructions for monitoring a pairing efficiency metric of wireless devices in the sector, and adjusting a maximum number of wireless devices able to attach to one of the at least two wireless air interfaces based on the pairing efficiency metric. In another exemplary embodiment, software 212 can include instructions for determining that a pairing efficiency metric of wireless devices attached to the access node meets a first threshold, and adjusting a maximum number of wireless devices able to attach to one of the at least two wireless air interfaces responsive to the pairing efficiency metric meeting the threshold. In another exemplary embodiment, software 212 can include instructions for monitoring a pairing efficiency metric of wireless devices in the wireless sector, when the pairing efficiency metric rises above a threshold, increasing a maximum number of wireless devices able to attach to one of the at least two wireless air interfaces, and when the pairing efficiency metric falls below the threshold, decreasing the maximum number of wireless devices able to attach to one of the at least two wireless air interfaces.

Figure 3:
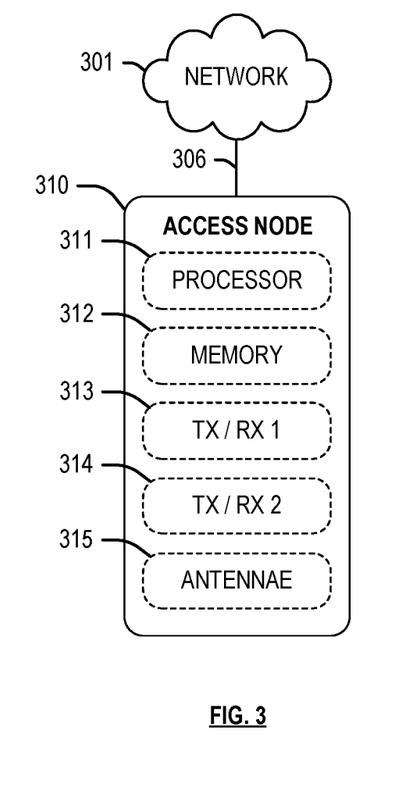
FIG. 3 depicts an exemplary access node for limiting dual connectivity based on a pairing efficiency of wireless devices in a sector.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, first transceiver 313, second transceiver 314, and antennae 315. Processor 311 executes instructions stored on memory 312, and transceivers 313 and 314 (in conjunction with antennae 315) enable wireless communication respectively using a first RAT (e.g. 4G LTE) and a second RAT (e.g. 5G NR). Thus, access node 310 may be determined as being capable of communicating using both 4G LTE and 5G NR. For example, access node 310 may be configured to transmit control information using the 4G LTE transceiver 313 and data information using the 5G NR transceiver 314. Further, antenna elements 315 may include an array of antenna elements that are configured to deploy a radio air interface over one or more wireless sectors, form beams within these sectors, employ multiple-input-multiple-output (MIMO), etc.

Exemplary instructions stored on memory 312 can include instructions for determining whether or not wireless devices attached to access node 310 are capable of communicating using both RATs, and instruct the access node 310 to broadcast an indicator in, for example, a system information message. For example, access node 310 may use the 4G carrier to control and set up a dual connectivity session with the wireless devices. In other words, control information (including SIB messages) is transmitted from the access node 310 using the 4G carrier, while the 5G carrier is utilized for transmission of data. Further, the processing node may be configured to perform operations including monitoring a pairing efficiency metric associated with the wireless devices and adjusting a maximum number of wireless devices able to attach to the 5G wireless air interfaces based on the pairing efficiency metric. For example, upon determining that the pairing efficiency metric rises above a threshold, the maximum number may be increased, and upon determining that the pairing efficiency metric falls below a threshold, the maximum number may be reduced or decreased.

Figure 4:
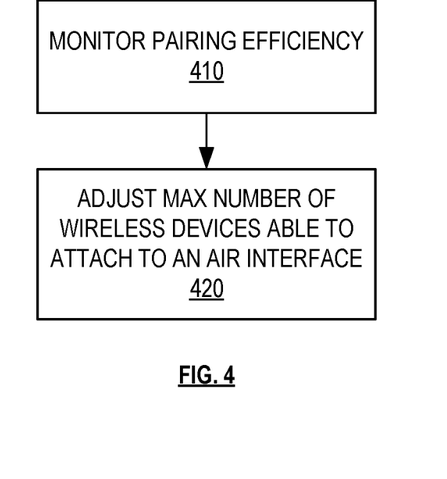
FIG. 4 depicts an exemplary method for limiting dual connectivity based on a pairing efficiency of wireless devices in a sector.

FIG. 4 depicts an exemplary method for limiting dual connectivity based on a pairing efficiency. The method of FIG. 4 may be implemented by a processing node communicatively coupled to one or more access nodes, controller nodes, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a pairing efficiency is monitored for wireless devices attached to an access node. The access node may be configured to deploy carriers using at least two RATs (i.e. wireless air interfaces), e.g. a 4G LTE wireless air interface, and a 5G NR wireless air interface. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. Further, the access node is configured to utilize 5G EN-DC, dual connections are initiated with one or more wireless devices using both 4G and 5G carriers, the 4G carrier being used to transmit control information, and the 5G carrier being used to transmit data information. Further, the pairing efficiency metric may be based on any combination of an orthogonality associated with the wireless devices attached to the access node, an angular separation required for MIMO pairing for the wireless devices, a threshold data buffer requirement of a buffer on the access node, or a number of wireless devices that is eligible to join a MU-MIMO group. Thus, the pairing efficiency metric can be based on performance of MIMO streams, or any other criteria associated with the wireless device. For example, the pairing efficiency metric can be based on one or more of a size of each MIMO group comprising the eligible wireless devices, a quantity of eligible wireless devices participating in the MIMO groups, a percentage of total wireless devices attached to the access node, a throughput of each of the one or more MIMO groups in the sector, an average throughput of each MIMO group or each wireless device in each MIMO group, or an aggregate throughput (i.e. total throughput) of all MIMO signals within the sector. Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources. In an exemplary embodiment, the pairing efficiency metric is based on a ratio of a number of wireless devices qualifying for MU-MIMO versus a total number of wireless devices attached to the access node.

At 420, the maximum number of wireless devices able to attach to an air interface is adjusted based on the pairing efficiency. For example, when the pairing efficiency metric rises to meet (or exceed) a threshold, it can be inferred that more wireless devices are able to utilize MIMO on the 5G wireless air interface, and the maximum number of wireless devices able to attach to the 5G wireless air interface is increased. The increase in wireless devices would not negatively impact the amount of resources in the 5G wireless air interface, because more wireless devices are able to use the same physical resource blocks (due to orthogonality). Whereas, when the pairing efficiency metric falls below the threshold, it can be inferred that fewer wireless devices are able to utilize MIMO on the 5G wireless air interface, and the maximum number of wireless devices able to attach to the 5G wireless air interface is reduced. The reduction in wireless devices ensures that the resources (e.g. physical resource blocks) on the 5G wireless air interface remain available for MIMO or other transmissions for the wireless devices that are eligible. In an exemplary embodiment, different thresholds are used to compare the pairing efficiency metric. For example, a first threshold may be compared when the pairing efficiency metric is rising, and a second threshold may be compared when the pairing efficiency metric is falling. The thresholds may be selected based on a hysteresis, or any other consideration depending on the type of pairing efficiency metric. In an exemplary embodiment, the pairing efficiency metric comprises a ratio or percentage of wireless devices qualifying for MU-MIMO, and the threshold may comprise 50% or a 1:1 ratio, or slightly above and below these values. In an exemplary embodiment, operations 410-420 are performed when the access node is loaded, or when the 5G carrier is loaded past a load threshold. Thus, the disclosed operations alleviate the load on the 5G carrier.

Figure 5:
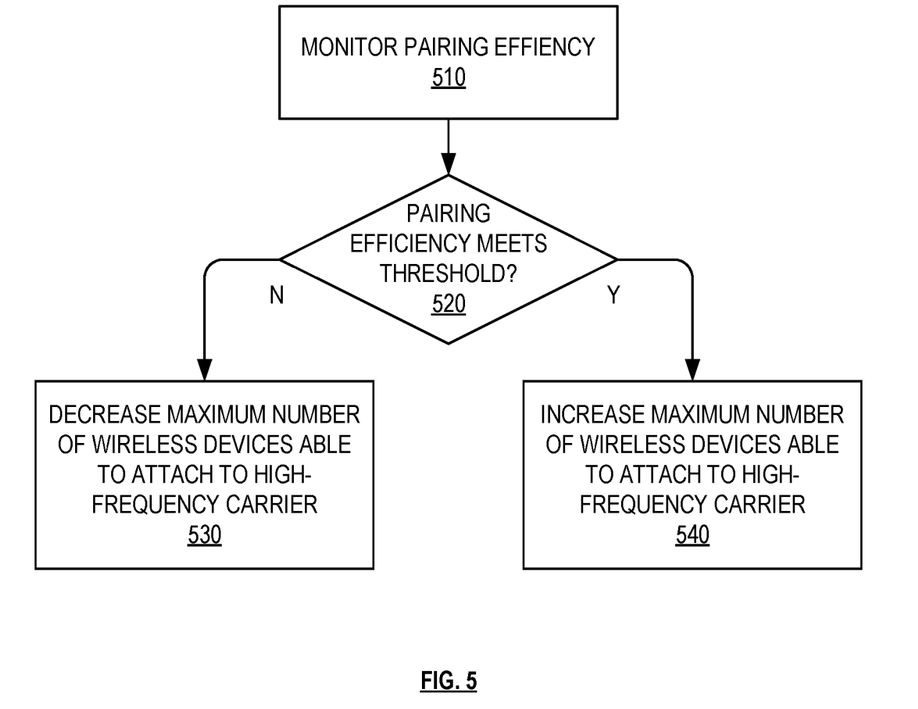
FIG. 5 depicts another exemplary method for limiting dual connectivity based on a pairing efficiency of wireless devices in a sector.

FIG. 5 depicts an exemplary method for limiting dual connectivity based on a pairing efficiency. The method of FIG. 5 may be implemented by a processing node communicatively coupled to one or more access nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a pairing efficiency is monitored for wireless devices attached to an access node. The access node may be configured to deploy carriers using at least two RATs (i.e. wireless air interfaces), e.g. a 4G LTE wireless air interface, and a 5G NR wireless air interface. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. Further, the access node is configured to utilize 5G EN-DC, dual connections are initiated with one or more wireless devices using both 4G and 5G carriers, the 4G carrier being used to transmit control information, and the 5G carrier being used to transmit data information. Further, the pairing efficiency metric may be based on any combination of an orthogonality associated with the wireless devices attached to the access node, an angular separation required for MIMO pairing for the wireless devices, a threshold data buffer requirement of a buffer on the access node, or a number of wireless devices that is eligible to join a MU-MIMO group. Thus, the pairing efficiency metric can be based on performance of MIMO streams, or any other criteria associated with the wireless device. For example, the pairing efficiency metric can be based on one or more of a size of each MIMO group comprising the eligible wireless devices, a quantity of eligible wireless devices participating in the MIMO groups, a percentage of total wireless devices attached to the access node, a throughput of each of the one or more MIMO groups in the sector, an average throughput of each MIMO group or each wireless device in each MIMO group, or an aggregate throughput (i.e. total throughput) of all MIMO signals within the sector. Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources. In an exemplary embodiment, the pairing efficiency metric is based on a ratio of a number of wireless devices qualifying for MU-MIMO versus a total number of wireless devices attached to the access node.

At 520, the pairing efficiency is compared with a threshold, and at 530 and 540, the maximum number of wireless devices able to attach to an air interface is adjusted based on the pairing efficiency. For example, when the pairing efficiency metric rises to meet (or exceed) a threshold, it can be inferred that more wireless devices are able to utilize MIMO on the 5G wireless air interface, and the maximum number of wireless devices able to attach to the 5G wireless air interface is increased at 540. The increase in wireless devices would not negatively impact the amount of resources in the 5G wireless air interface, because more wireless devices are able to use the same physical resource blocks (due to orthogonality). Whereas, when the pairing efficiency metric falls below the threshold, it can be inferred that fewer wireless devices are able to utilize MIMO on the 5G wireless air interface, and the maximum number of wireless devices able to attach to the 5G wireless air interface is reduced at 530. The reduction in wireless devices ensures that the resources (e.g. physical resource blocks) on the 5G wireless air interface remain available for MIMO or other transmissions for the wireless devices that are eligible. In an exemplary embodiment, different thresholds are used to compare the pairing efficiency metric at 520. For example, a first threshold may be compared when the pairing efficiency metric is rising, and a second threshold may be compared when the pairing efficiency metric is falling. The thresholds may be selected based on a hysteresis, or any other consideration depending on the type of pairing efficiency metric. In an exemplary embodiment, the pairing efficiency metric comprises a ratio or percentage of wireless devices qualifying for MU-MIMO, and the threshold may comprise 50% or a 1:1 ratio, or slightly above and below these values. In an exemplary embodiment, operations 510-540 are performed when the access node is loaded, or when the 5G carrier is loaded past a load threshold. Thus, the disclosed operations alleviate the load on the 5G carrier.

Figure 6A:
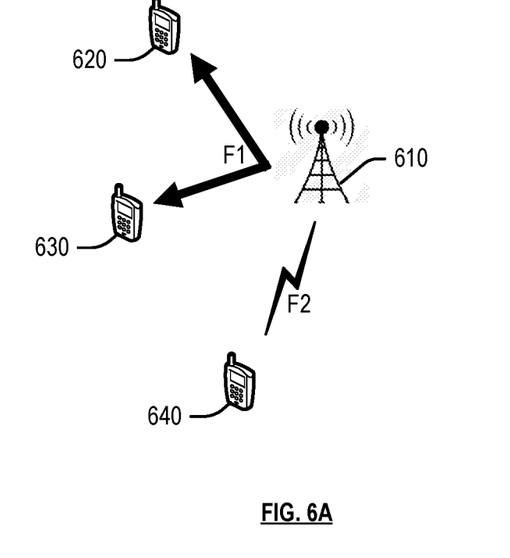
FIGS. 6A-6B depict exemplary configurations of dual connectivity based on a pairing efficiency of wireless devices in a sector.
Figure 6B:
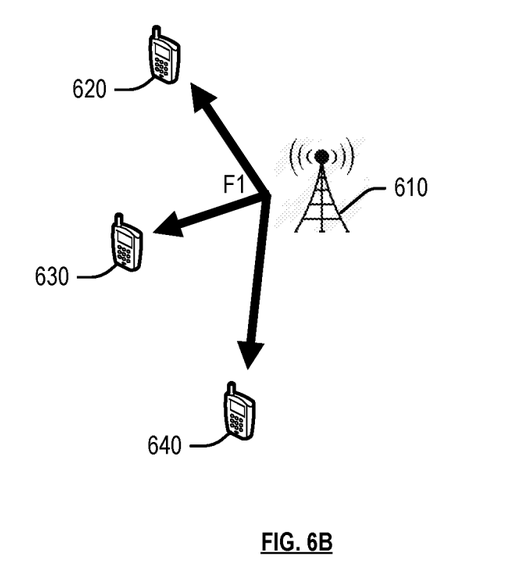

FIGS. 6A-6B depict exemplary configurations of dual connectivity based on a pairing efficiency of wireless devices in a sector. Access node 610 may be configured to deploy carriers using at least two RATs (i.e. wireless air interfaces), e.g. a 4G LTE wireless air interface, and a 5G NR wireless air interface. Each RAT may be configured to utilize a different frequency band or sub-band, a different channel size or bandwidth, and so on. For example, the 5G NR carrier may be configured to utilize higher frequencies and larger channel bandwidths than the 4G LTE carrier. For example, the 5G NR wireless air interface may utilize a first one or more frequency bands referred to here as F1, and the 4G LTE wireless air interface may utilize a second one or more frequency bands referred to here as F2. Further, access node 610 can be configured to communicate using both RATs at the same time. For example, access node 610 can comprise antennae that are configured to communicate with wireless devices 620, 630 via the 5G wireless air interface using frequencies F1 and with wireless device 640 via the 4G wireless air interface using frequencies F2. In an exemplary embodiment, access node 610 is configured to utilize 5G EN-DC, dual connections are initiated with wireless devices 620, 630 using both 4G and 5G carriers, the 4G carrier being used to transmit control information, and the 5G carrier being used to transmit data information. For example, as shown herein, wireless devices 620, 630 are illustrated as receiving a MU-MIMO data stream using frequencies F1, and wireless device 640 is illustrated as using a standard 4G communication link using frequencies F2.

Further, access node 610 may be configured to perform operations including monitoring a pairing efficiency metric associated with wireless devices 620, 630, 640 (and any other wireless devices attached to access node 610 and not shown herein), and adjusting a maximum number of wireless devices able to attach to the 5G wireless air interfaces based on the pairing efficiency metric. For example, upon determining that the pairing efficiency metric rises above a threshold, the maximum number may be increased, and upon determining that the pairing efficiency metric falls below a threshold, the maximum number may be reduced or decreased. For example, as shown in FIG. 6A, wireless devices 620, 630 appear to be eligible for and participating in a MIMO stream using frequencies F1. The pairing efficiency metric can be based on performance of these wireless devices, or any other criteria associated with each of wireless devices 620, 630, 640. For example, wireless device 640 may become eligible for MU-MIMO based on a location, signal strength, orthogonality, etc. Thus, the maximum number of wireless devices able to attach to the 5G wireless air interface is increased. The increase in wireless devices would not negatively impact the amount of resources in the 5G wireless air interface, because more wireless devices are able to use the same physical resource blocks (due to orthogonality). Thus, with reference to FIG. 6B, wireless device 640 is shown as joining in the MU-MIMO group with wireless devices 620, 630 and receiving data via frequencies F1.

Figure 7A:
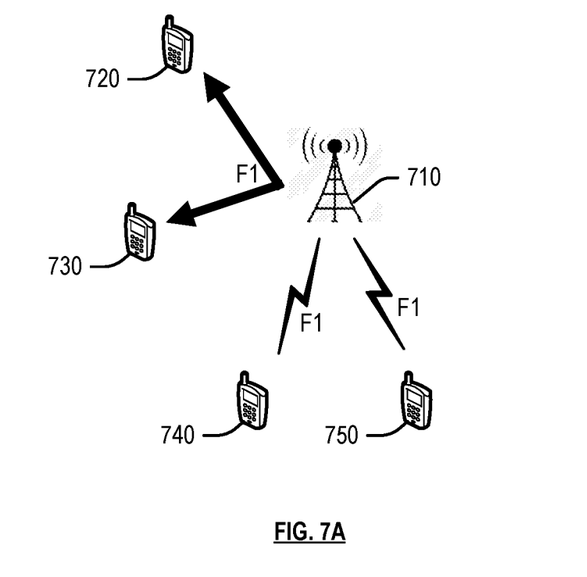
FIGS. 7A-7B depict additional exemplary configurations of dual connectivity based on a pairing efficiency of wireless devices in a sector.
Figure 7B:
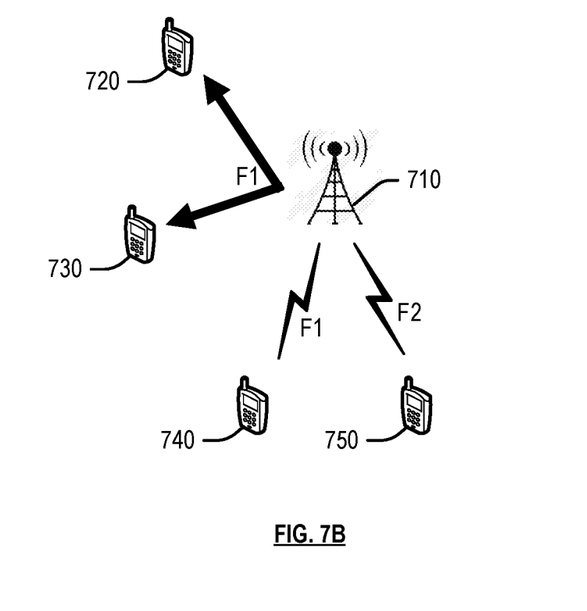

Whereas, when the pairing efficiency metric falls below the threshold, it can be inferred that fewer wireless devices are able to utilize MIMO on the 5G wireless air interface, and the maximum number of wireless devices able to attach to the 5G wireless air interface is reduced. This scenario is shown in FIGS. 7A-7B. With reference to FIG. 7A, access node 710 is illustrated as communicating with wireless devices 720, 730, 740, and 750 via the 5G wireless air interface using frequencies F1. Wireless devices 720, 730 are illustrated as receiving a MU-MIMO data stream using frequencies F1, and wireless devices 740, 750 are illustrated as using a standard 5G communication link using frequencies F1. In this case, access node 710 may determine that a pairing efficiency metric associated with wireless devices 720-740 is below a threshold. For example, if the pairing efficiency metric is associated with a ratio of wireless devices receiving MU-MIMO transmissions, then in this case, at least half of the wireless devices (e.g. wireless devices 740 and 750) are not receiving MU-MIMO transmissions. Thus, the maximum number of wireless devices able to attach to the 5G wireless air interface is decreased. With reference to FIG. 7B, at least wireless device 750 is now illustrated as communicating with the access node 710 via a standard 4G communication link using frequencies F2. The reduction in wireless devices attached to frequencies F1 ensures that the resources (e.g. physical resource blocks) on the 5G wireless air interface remain available for MIMO or other transmissions for the wireless devices that are eligible, e.g. wireless devices 720, 730. In an exemplary embodiment, different thresholds are used to compare the pairing efficiency metric. For example, a first threshold may be compared when the pairing efficiency metric is rising, and a second threshold may be compared when the pairing efficiency metric is falling. The thresholds may be selected based on a hysteresis, or any other consideration depending on the type of pairing efficiency metric. In an exemplary embodiment, the pairing efficiency metric comprises a ratio or percentage of wireless devices qualifying for MU-MIMO, and the threshold may comprise 50% or a 1:1 ratio, or slightly above and below these values.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for limiting dual connectivity in a wireless sector served by at least two wireless air interfaces, the method comprising:
monitoring a pairing efficiency metric of wireless devices attached to first wireless air interface of the at least two wireless air interfaces, wherein the pairing efficiency metric is associated with existing or potential MIMO data streams using the first wireless air interface; and
adjusting a maximum number of wireless devices able to attach to the first wireless air interface based on the pairing efficiency metric.

2. The method of claim 1, further comprising:
determining that the pairing efficiency metric rises above a threshold; and
increasing the maximum number.

3. The method of claim 1, further comprising:
determining that the pairing efficiency metric falls below a threshold; and
reducing the maximum number.

4. The method of claim 1, wherein the at least two wireless air interfaces comprise the first wireless air interface associated with a first bandwidth and a second wireless air interface associated with a second bandwidth, the first bandwidth being greater than the second bandwidth.

5. The method of claim 4, wherein:
the first wireless air interface comprises a $5^{th}$ generation new radio (5G-NR) wireless air interface, and
the second wireless air interface comprises a $4^{th}$ generation long-term evolution (4G-LTE) wireless air interface.

6. The method of claim 5, wherein wireless devices attached to the first wireless air interface and eligible for MIMO are configured to receive MIMO data streams via the first wireless air interface.

7. The method of claim 6, wherein the wireless devices receiving MIMO data streams via the first wireless air interface are further attached to the second wireless air interface and configured to send and receive control transmissions via the second wireless air interface.

8. The method of claim 1, wherein the pairing efficiency metric is based on one or more of an orthogonality, an angular separation required for MIMO pairing, a threshold data buffer requirement, or a number of wireless devices eligible to join a multi-user MIMO (MU-MIMO) group.

9. A system for limiting dual connectivity in a wireless sector, the system comprising:
an access node configured to deploy at least two wireless air interfaces; and
a processing node coupled to the access node, the processing node comprising a memory and a processor that are configured to perform operations comprising:
determining that a pairing efficiency metric of wireless devices attached to a first wireless air interface of the at least two wireless air interfaces meets a first threshold, wherein the pairing efficiency metric is associated with existing or potential MIMO data streams using the first wireless air interface; and
adjusting a maximum number of wireless devices able to attach to the first wireless air interface responsive to the pairing efficiency metric meeting the threshold.

10. The system of claim 9, wherein the at least two wireless air interfaces comprise the first wireless air interface associated with a first bandwidth and a second wireless air interface associated with a second bandwidth, the first bandwidth being greater than the second bandwidth.

11. The system of claim 10, wherein:
the first wireless air interface comprises a $5^{th}$ generation new radio (5G-NR) wireless air interface, and
the second wireless air interface comprises a $4^{th}$ generation long-term evolution (4G-LTE) wireless air interface.

12. The system of claim 11, wherein wireless devices receiving MIMO data streams via the first wireless air interface are further attached to the second wireless air interface and configured to send and receive control transmissions via the second wireless air interface.

13. A processing node for limiting dual connectivity in a wireless sector served by at least two wireless air interfaces, the processing node comprising a memory and a processor that are configured to perform operations comprising:
monitoring a pairing efficiency metric of wireless devices attached to first wireless air interface of the at least two wireless air interfaces, wherein the pairing efficiency metric is associated with existing or potential MIMO data streams using the first wireless air interface;
when the pairing efficiency metric rises above a threshold, increasing a maximum number of wireless devices able to attach to the first wireless air interface; and
when the pairing efficiency metric falls below the threshold, decreasing the maximum number of wireless devices able to attach to the first wireless air interface.

14. The processing node of claim 13, wherein the at least two wireless air interfaces comprise the first wireless air interface associated with a first bandwidth and a second wireless air interface associated with a second bandwidth, the first bandwidth being greater than the second bandwidth.

15. The processing node of claim 14, wherein:
the first wireless air interface comprises a $5^{th}$ generation new radio (5G-NR) wireless air interface, and
the second wireless air interface comprises a $4^{th}$ generation long-term evolution (4G-LTE) wireless air interface.

* * * * *